United States Patent
Yang et al.

(10) Patent No.: US 8,126,258 B2
(45) Date of Patent: Feb. 28, 2012

(54) METHOD OF DETECTING DEFECTS IN PATTERNS ON SEMICONDUCTOR SUBSTRATE BY COMPARING SECOND IMAGE WITH REFERENCE IMAGE AFTER ACQUIRING SECOND IMAGE FROM FIRST IMAGE AND APPARATUS FOR PERFORMING THE SAME

(75) Inventors: Yu-Sin Yang, Seoul (KR); Chung-Sam Jun, Suwon-si (KR); Jong-An Kim, Seoul (KR); Moon-Shik Kang, Yongin-si (KR); Ji-Hye Kim, Anyang-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1146 days.

(21) Appl. No.: 11/979,776

(22) Filed: Nov. 8, 2007

(65) Prior Publication Data

US 2008/0112608 A1    May 15, 2008

(30) Foreign Application Priority Data

Nov. 9, 2006  (KR) ................ 10-2006-0110420

(51) Int. Cl.
*G06K 9/00* (2006.01)
(52) U.S. Cl. ........ 382/145; 382/141; 382/144; 382/147; 382/149; 382/151; 348/125; 348/126; 348/129; 348/130; 438/14; 438/16
(58) Field of Classification Search .................. None
See application file for complete search history.

(56) References Cited

U.S. PATENT DOCUMENTS

| 5,091,963 | A | | 2/1992 | Litt et al. |
| 5,798,831 | A | * | 8/1998 | Hagiwara ............... 356/237.2 |
| 6,263,099 | B1 | * | 7/2001 | Maeda et al. .............. 382/149 |
| 6,292,583 | B1 | * | 9/2001 | Maruo ...................... 382/149 |

(Continued)

FOREIGN PATENT DOCUMENTS

JP   08-045999   2/1996

(Continued)

OTHER PUBLICATIONS

Korean Office Action issued in corresponding Korean Patent Application No. 2006-110420 on Oct. 19, 2007.

*Primary Examiner* — Sath V Perungavoor
*Assistant Examiner* — Jason Heidemann
(74) *Attorney, Agent, or Firm* — Harness, Dickey & Pierce, P.L.C.

(57) ABSTRACT

In a method of detecting defects in patterns and an apparatus for performing the method, a first image of a detection region on a semiconductor substrate may be acquired. A second image may be acquired from the first image by performing a Fourier transform and performing a low pass filtering. The second image may be compared with a reference image so that the defects of the detection region are detected. Existence of the defect of the second image is determined using a relation value between a grey level of each of pixels of the second image and the reference image, respectively. When a defect exists, the horizontal and the vertical positions of the pixel where the relation value is minimum are combined to determine the position of the defect.

12 Claims, 6 Drawing Sheets

U.S. PATENT DOCUMENTS

| | | | |
|---|---|---|---|
| 6,831,997 B2 * | 12/2004 | Kamon | 382/144 |
| 2001/0030296 A1 * | 10/2001 | Ishimaru et al. | 250/559.4 |
| 2002/0054703 A1 * | 5/2002 | Hiroi et al. | 382/149 |
| 2003/0006371 A1 | 1/2003 | Watanabe et al. | 250/310 |
| 2004/0188643 A1 * | 9/2004 | Weiss et al. | 250/559.42 |
| 2006/0060781 A1 * | 3/2006 | Watanabe et al. | 250/310 |
| 2006/0239535 A1 * | 10/2006 | Takada et al. | 382/145 |
| 2007/0103893 A1 * | 5/2007 | Tanaka | 362/138 |
| 2008/0163140 A1 * | 7/2008 | Fouquet et al. | 716/4 |

FOREIGN PATENT DOCUMENTS

| | | |
|---|---|---|
| JP | 11-340292 | 12/1999 |
| KR | 1997-0077125 | 12/1997 |
| KR | 1020010106630 | 12/2001 |

* cited by examiner

METHOD OF DETECTING DEFECTS IN PATTERNS ON SEMICONDUCTOR SUBSTRATE BY COMPARING SECOND IMAGE WITH REFERENCE IMAGE AFTER ACQUIRING SECOND IMAGE FROM FIRST IMAGE AND APPARATUS FOR PERFORMING THE SAME

PRIORITY STATEMENT

This application claims priority under 35 U.S.C. §119 to Korean Patent Application No. 2006-110420, filed on Nov. 9, 2006, in the Korean Intellectual Property Office (KIPO), the entire contents of which are incorporated herein by reference.

BACKGROUND

1. Field

Example embodiments relate to a method of detecting defects in patterns and an apparatus for performing the method. More particularly, example embodiments relate to a method of detecting defects in patterns by comparing images and an apparatus for performing the method.

2. Description of the Related Art

As the design requirements for semiconductor devices become more strict, so may the requirements for detecting defects in patterns formed on a semiconductor substrate. Generally, an image detection technology using a light or an electron beam may be employed for detecting defects in patterns. The technology may compare images acquired using the light or the electron beam to detect the defects. Particularly, adjacent images may be compared with each other to find a portion where a difference exists so that the defects of the patterns may be detected.

Storing data relating to the adjacent images may be required in order to use the method described above. Comparing at least three images to one another to find differences between the images may be required. Thus, large storage spaces for storing the images may be required.

Further, though the adjacent images may be obtained from the same patterns, the colors of the images may be different. Therefore, errors, for example, recognizing differences in the colors of the images as defects, may occur when detecting defects in the patterns.

When comparing the images to detect the defects in the patterns, a precise alignment between the images may be required. When the images are not aligned precisely, the defects of the patterns may not be detected precisely.

SUMMARY

At least one example embodiment may provide a method of detecting defects in patterns on a semiconductor substrate.

At least one example embodiment may provide an apparatus for performing the above-mentioned method.

In accordance with at least one example embodiment, a method of detecting defects in patterns may be provided. In the method, a first image of a detection region on a semiconductor substrate may be acquired. A second image may be acquired from the first image by performing a Fourier transform, which may transform a two-dimensional domain to a frequency domain, and by performing a low pass filtering, which may preserve a low frequency domain among the frequency domain and may reduce a high frequency domain among the frequency domain. The second image may be compared with a predetermined or given reference image to detect the defects in the detection region.

According to at least one example embodiment, the detection region may include periodical patterns.

The method according to at least one example embodiment may include setting the reference image prior to acquiring the first image.

According to at least one example embodiment, setting the reference image may include acquiring a third image of periodical patterns, which may be free of defects, acquiring a fourth image by performing a Fourier transform and a low pass filtering with respect to the third image, and by setting the fourth image as the reference image.

According to still another example embodiment, detecting the defects of the detection region may include determining whether the defects in the second image exist or not, and determining positions of the defects when the defects in the second image exist.

Further, determining whether the defects in the second image exist or not may include calculating relation values between a grey level of each of pixels of the second image and a grey level of each of the pixels in the reference image with respect to horizontal positions and vertical positions of the pixels in the second image and the pixels in the reference image. A defect may not be determined to exist in the second image when the relation values, with respect to the horizontal positions of the pixels, and the relation values, with respect to the vertical positions of the pixels, are larger than a predetermined or given relation value. In contrast, a defect may be determined to exist in the second image when at least one among the relation values with respect to the horizontal positions of the pixels, and the relation values with respect to the vertical positions of the pixels is smaller than the predetermined or given relation value.

According to at least one example embodiment, positions of the defects may be determined by acquiring a horizontal position of a pixel where a relation value with respect to the horizontal position of the pixel is below the predetermined or given relation value and is the minimum relation value. A vertical position of a pixel where a relation value with respect to the vertical position of the pixel is below the predetermined or given relation value and is the minimum relation value may be acquired. The horizontal position of the pixel and the vertical position of the pixel may be combined to determine the positions of the defects.

In accordance with at least one example embodiment, an apparatus for detecting defects may include a storing unit, a first acquisition unit, a second acquisition unit, and a detecting unit. The storing unit may store a reference image. The first acquisition unit may acquire a first image of a detection region on a semiconductor substrate. The second acquisition unit may acquire a second image by filtering the first image. The detecting unit may detect the defects of the detection region by comparing the second image with the reference image.

According to at least one example embodiment, the detection region may include periodical patterns.

According to at least one example embodiment, the second acquisition unit may include a converting part and a filtering part. The converting part may convert a two-dimensional domain to a frequency domain by Fourier-transforming the first image. The filtering part may low-pass-filter the first image in order to keep a low frequency domain among the frequency domain and to reduce a high frequency domain.

According to at least one example embodiment, the detecting unit may include a determining part and a setting part. The determining part may determine whether the defect exists in the second image or not. The setting part may set a position of the defect when the defect exists in the second image.

According to at least one example embodiment, a Fourier transform and low-pass filtering may be performed on an image of periodical patterns. The transformed and filtered image may be compared with the reference image so that the defects of the patterns may be detected. When comparing the transformed and filtered image with the reference image, relations of a grey level of each of pixels may be used. Therefore, an alignment between the reference image and the transformed and filtered image may not be required. A factor such as differences in colors of the patterns, which may cause errors when detecting the defects of the patterns, may be removed by filtering.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DESCRIPTION OF EXAMPLE EMBODIMENTS

Detailed example embodiments are disclosed herein. However, specific structural and functional details disclosed herein are merely representative for purposes of describing example embodiments. Example embodiments may, however, be embodied in many alternative forms and should not be construed as limited to only example embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
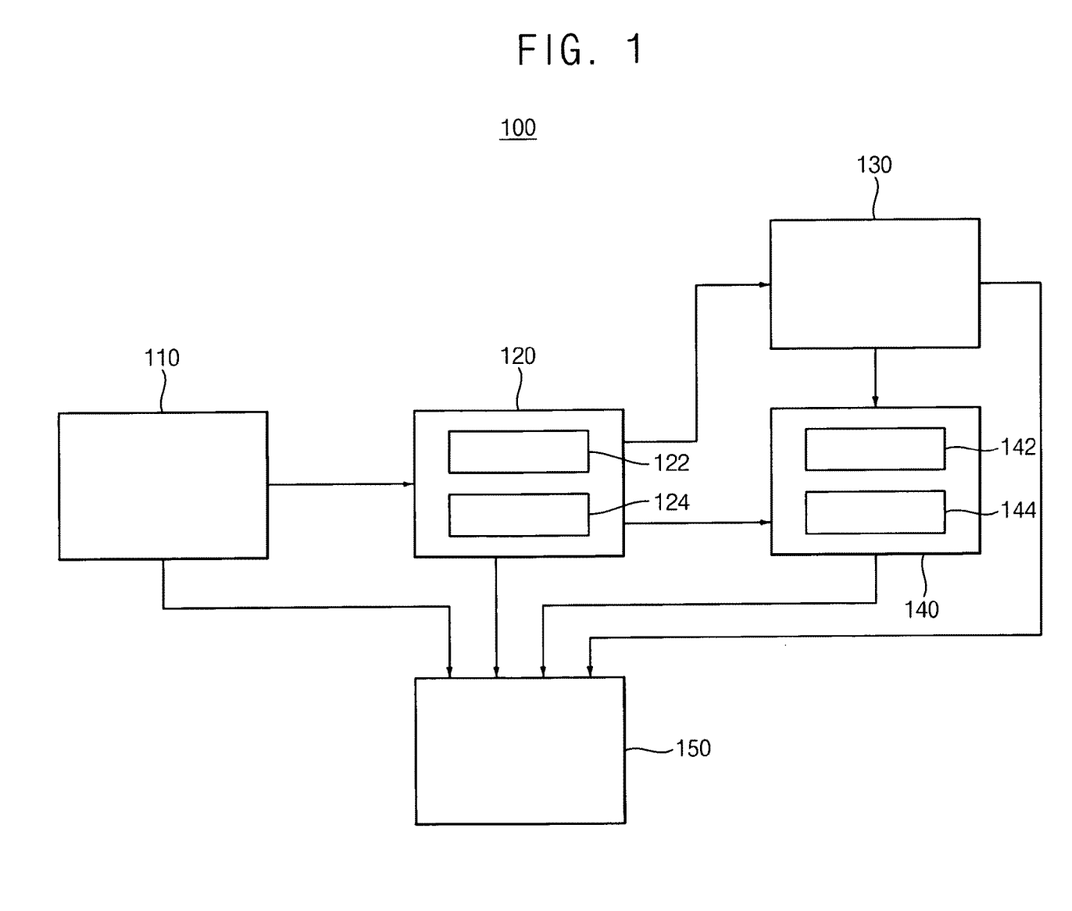
FIG. 1 is a block diagram illustrating an apparatus for detecting defects in patterns in accordance with at least one example embodiment.

FIG. 1 is a block diagram illustrating an apparatus for detecting defects in patterns in accordance with at least one example embodiment of the example embodiments.

Referring to FIG. 1, an apparatus 100 for detecting defects in patterns may include a first acquisition unit 110, a second acquisition unit 120, a storing unit 130, a detecting unit 140, and a displaying unit 150.

The first acquisition unit 110 may be arranged over a semiconductor substrate. The first acquisition unit 110 may acquire a first image of patterns formed on the semiconductor substrate. The patterns may be formed in cell regions in the semiconductor substrate. Further, the patterns may include a periodical pattern where substantially the same shape may be repeatedly arranged. Examples of the first acquisition unit 110 may include a charge coupled device (CCD), a scanning electron microscope (SEM), etc. The first acquisition unit 110 may acquire the first image using a light or an electron beam.

The second acquisition unit 120 may be connected to the first acquisition unit 110 and may acquire a second image by processing the first image. The second acquisition unit 120 may include a converting part 122 and a filtering part 124. The converting part 122 may include a microprocessor. The converting part 122 may convert a two-dimensional domain to a frequency domain by performing a Fourier transform over the first image. The filtering part 124 may include a low pass filter which may reduce a high frequency domain among the frequency domain of the first image and preserve a low frequency domain in order to obtain the second image. When defects of the patterns are detected, errors due to color differences of the patterns may be ignored because the filtering part 124 may filter a specific frequency domain due to periodical patterns.

The storing unit 130 may be connected with the second acquisition unit 120 to store a reference image. The first acquisition unit 110 may acquire the first image from normal patterns without defects. The second acquisition unit 120 may acquire the second image by processing the first image. The second image may correspond to the reference image. In at least one example embodiment, the reference image may be acquired from patterns of an objective wafer on which the patterns may be formed. In at least one example embodiment, the reference image may be acquired from patterns of another wafer which may have substantially the same patterns as the objective wafer.

The detecting unit 140 may be connected with the second acquisition unit 120 and the storing unit 130, respectively. The detecting unit 140 may compare the second image, which may be acquired from the patterns of the objective wafer, with the reference image to detect the defects in the patterns. The detecting unit 140 may include a determining part 142 and a setting part 144.

The determining part 142 may determine defects by comparing the second image and the reference image. The determining part 142 may include a calculator and a comparator.

The calculator may calculate relation values between a grey level of each of the pixels in the second image and a grey level of each of the pixels in the reference image. The relation values may be classified into relation values according to horizontal positions of the pixels and relation values according to vertical positions of the pixels. The relation values may be different from each other according to similarities between the grey level of each of the pixels in the second image and the grey level of each of the pixels in the reference image. When the grey levels of two pixels are similar, the relation value may become closer to 1. When grey levels of two pixels are different, the relation value may become closer to 0. The comparator may determine that there is no defect in the second image when the relation values according to the horizontal positions of pixels and the relation values according to the vertical positions of pixels are larger than a predetermined or given relation value. The comparator may determine that a defect exists in the second image when at least one among the relation values according to the horizontal positions of pixels and the relation values according to the vertical positions of pixels is smaller than the predetermined or given relation value. The predetermined or given relation value may be between 0 and 1. The predetermined or given relation value may be set closer to 1 in order to detect the defects in the patterns precisely. The predetermined or given relation value may be set farther from 1 in order to detect the defects of the patterns briefly.

The setting part 144 may set positions of the defects when the determining part 142 determines that there are defects in the second image. The setting part 144 may acquire a horizontal position of a pixel when the relation value according to the horizontal position of the pixel is below the predetermined or given relation value and is also at a minimum. In addition, the setting part 144 may acquire a vertical position of a pixel when the relation value according to the vertical position of the pixel is below the predetermined or given relation value and is also at a minimum. The horizontal position of the pixel and the vertical position of the pixel may be plural. The setting unit 144 may combine the horizontal position of the pixel and the vertical position of the pixel so that a coordinate value of the defect in the second image may be set.

The displaying unit 150 may be connected to the detecting unit 140. The displaying unit 150 may display the defects detected by the detecting unit 140. Positions of the defects may be displayed on a map which may have the shape of the semiconductor substrate.

Additionally, the displaying unit 150 may be connected to the first acquisition unit 110, the second acquisition unit 120, and the storing unit 130, respectively. The displaying unit 150 may display results acquired from the first acquisition unit 110, the second acquisition unit 120, and the storing unit 130.

Figure 2:
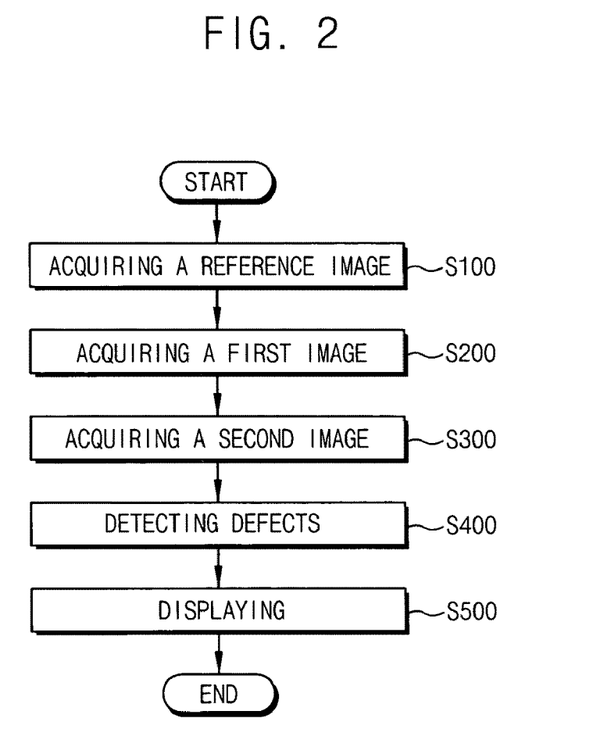
FIG. 2 is a flow chart illustrating a method of detecting defects in accordance with at least one example embodiment.

FIG. 2 is a flow chart illustrating a method of detecting defects in accordance with at least one example embodiment.

Referring to FIG. 2, in the method, a reference image may be acquired at S100.

In at least one example embodiment, a Fourier transform and a low pass filtering may be performed on an image of patterns formed without defects on a semiconductor substrate so that the reference image may be acquired. The patterns may have a periodical shape. Further, the patterns may be included in cell regions. When the patterns have no defect, the image of the patterns may be formed by the Fourier transform and the low pass filtering may be substantially the same as the reference image. For example, the reference image may be acquired from patterns of an objective wafer for detecting the defects of the patterns. For another example, the reference image may be acquired from another wafer having patterns substantially the same as the patterns of the object wafer.

A first image of the patterns, which may be formed on the semiconductor substrate, the patterns being objects for detecting defects, may be acquired at S200.

In at least one example embodiment, the first image of the patterns may be acquired. For example, the first image may be acquired using a scanning electron microscope (SEM) or a charge coupled device (CCD) camera. When the patterns do not have a periodical shape, the Fourier transform may not be applied to the first image easily. Therefore, it may be advantageous for the patterns to have a periodical shape. Examples of the periodical patterns may include linear patterns which may have a predetermined or given distance or patterns which may have a periodical recess, etc. For example, linear patterns which may have a predetermined or given distance may include a metal line, a gate electrode line, etc. The patterns which may have a periodical recess may include patterns which may have a contact hole or via hole, etc. An example of the first image may be an image of cell regions which may have periodical patterns and may be formed on the semiconductor substrate.

A second image may be acquired by filtering the first image at S300.

Figure 3:
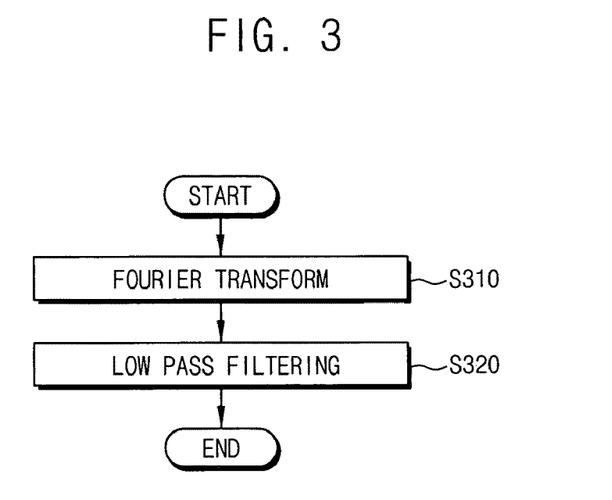
FIG. 3 is a flow chart illustrating a method of acquiring the second image in accordance with at least one example embodiment.

FIG. 3 is a flow chart illustrating a method of acquiring the second image in accordance with at least one example embodiment.

Referring to FIG. 3, a Fourier transform may be performed on the first image at S310.

The Fourier transform may convert a time domain to a frequency domain. Particularly, in a case of a video signal including an image, the Fourier transform may convert a two-dimensional domain to a frequency domain. That is, the two-dimensional domain of the first image may be converted to the frequency domain through the Fourier transform. The first image may be converted into data, which may include frequencies, through the Fourier transform. In at least one example embodiment, the two-dimensional domain including an image may be an object for the Fourier transform. Accordingly, the Fourier transform may be performed two-dimensionally. That is, the Fourier transform may be performed along a horizontal direction and a vertical direction. The Fourier transform may be performed in units of at least two pixels which may define the image.

The frequency data may be filtered at S320. When the frequency data are low pass-filtered, a high frequency domain among the data may reduced and a low frequency domain among the data may be preserved. The low pass filtering may be performed two-dimensionally so that a two-dimensional region including an image may be formed, because the Fourier transform may be performed two-dimensionally. That is, an image of the periodical patterns included in the high frequency domain may disappear and may leave only an image included in the low frequency domain. Therefore, due to the filtering, the second image, which may be different from the first image, may be acquired.

The second image may be compared with the reference image so that defects of the patterns may be detected at S400.

Figure 4:
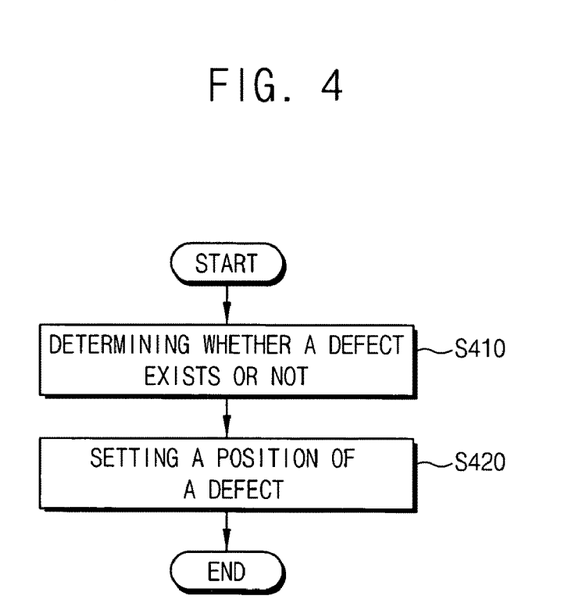
FIG. 4 is a flow chart illustrating a method of detecting the defects in accordance with at least one example embodiment.

FIG. 4 is a flow chart illustrating a method of detecting the defects according to at least one example embodiment.

Referring to FIG. 4, when defects exist in the patterns that are objects for the detection, a distortion may occur in the first image due to defects during the Fourier transform and the second image, which may be acquired from low pass filtering, may be different from the reference image. The second image may be compared with the reference image so that existence of the defects in the patterns may be determined at S410.

Figure 5:
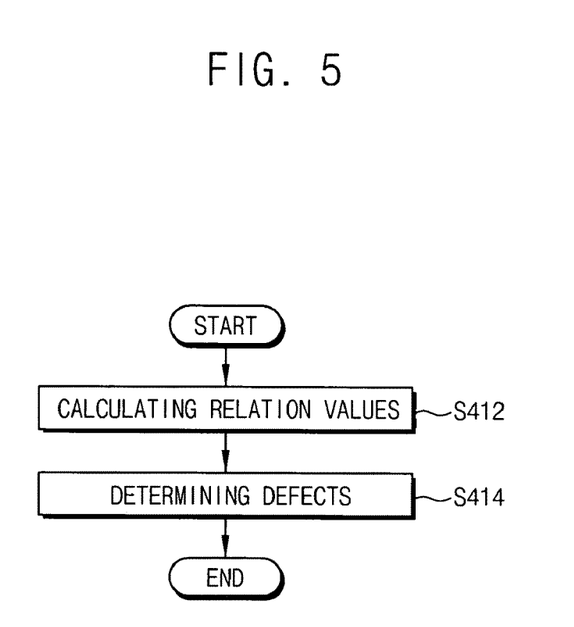
FIG. 5 is a flow chart illustrating a method of determining the existence of the defects in accordance with at least one example embodiment.

FIG. 5 is a flow chart illustrating a method of determining the existence of the defects according to at least one example embodiment.

Referring to FIG. 5, relation values between grey levels with respect to pixels in the second image and grey levels with respect to pixels in the reference image may be calculated at S412. Here, the relation values may be classified into a relation value with respect to horizontal positions of the pixels and a relation value with respect to vertical positions of the pixels. The relation values may vary in accordance with degree of similarity between the grey levels of two pixels compared with each other. When the grey levels of the two pixels are similar, the relation value may become closer to 1. When the grey levels of the two pixels are different, the relation value may become closer to 0. The second image may be determined to have no defect when the relation values according to the horizontal positions of the pixels and the relation values according to the vertical positions of the pixels are larger than a predetermined or given relation value, and the second image may be determined to have a defect when at least one among the relation values according to the horizontal positions of pixels and the relation values according to the vertical positions of pixels is smaller than the predetermined or given relation value at S414. The predetermined or given relation value of the relation may be between 0 and 1. The predetermined or given relation value may be set closer to 1 in order to detect the defects of the patterns precisely. The predetermined or given relation value may be set farther from 1 in order to detect the defects of the patterns briefly.

When the second image has a defect, a position of the defect may be set at S420.

Figure 6:
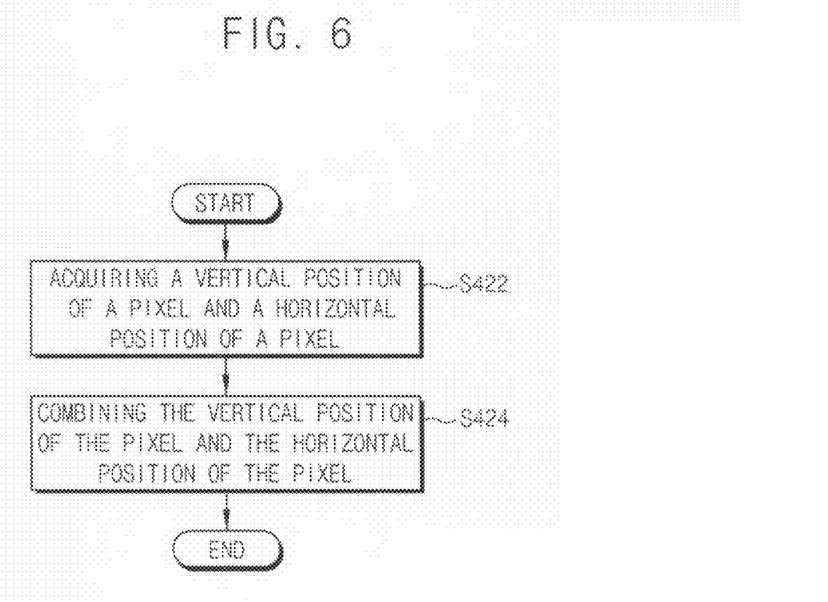
FIG. 6 is a flow chart illustrating a method of setting the position of the defect in accordance with at least one example embodiment.

FIG. 6 is a flow chart illustrating a method of setting the position of the defect according to at least one example embodiment.

Referring to FIG. 6, the horizontal position of the pixel may be acquired when the relation value according to the horizontal position of the pixel is below the predetermined or given relation value and is the minimum relation value at S422. In addition, the vertical position of the pixel may be acquired when the relation value according to the vertical position of the pixel is below the predetermined or given relation value and is the minimum relation value at 422. The horizontal position of the pixel and the vertical position of the pixel may be plural. The horizontal position of the pixel and the vertical position of the pixel may be combined so that the coordinate value of the defect in the second image may be set at S424.

The position of the detected defect may be displayed at S500. The position of the defect may be displayed on a map which may have the shape of the semiconductor substrate.

According to at least one example embodiment, defects may be detected using a Time Delay and Integration (TDI) image which may be acquired from an apparatus for detecting defects. An image having no defect may be filtered so that a reference image may be set. An image having a detected defect and an image having no detected defect may be filtered respectively so that the image having the defect and the image having no defect may be compared with the reference image.

Figure 7:
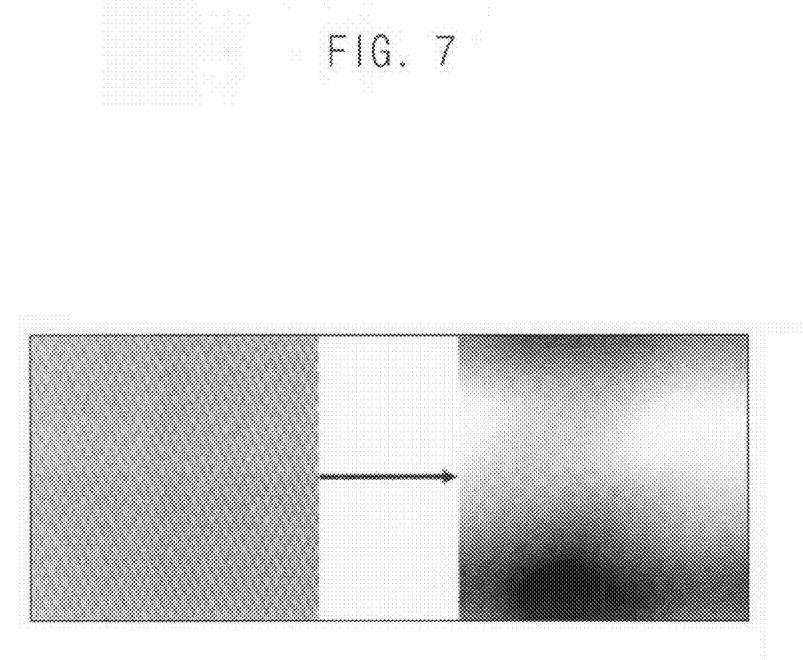
FIG. 7 is an image having minimal or no defects and a reference image acquired from filtering the image in accordance with at least one example embodiment.
Figure 8:
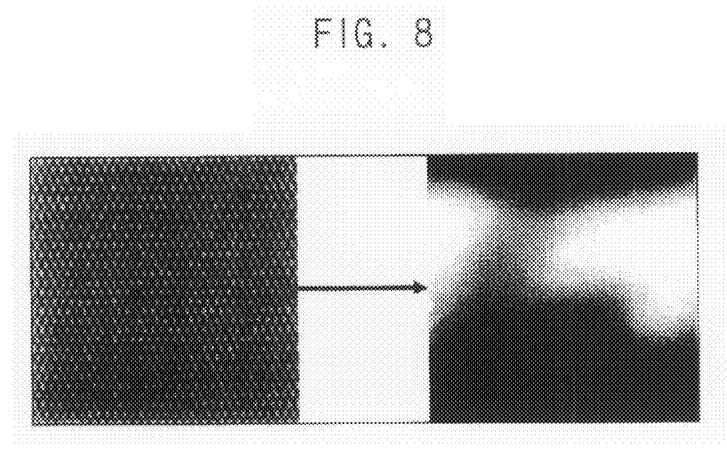
FIG. 8 is an image having no detected defects and a normal image acquired from filtering the image in accordance with at least one example embodiment.
Figure 9:
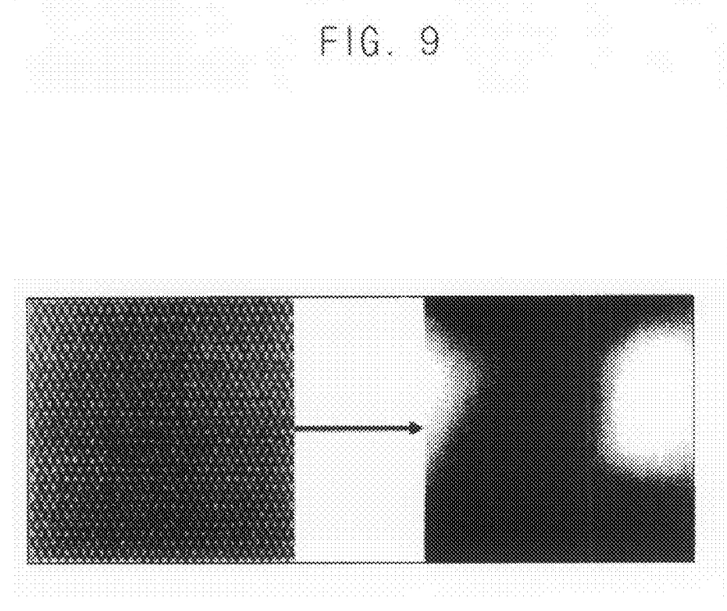
FIG. 9 is an image having a detected defect and an abnormal image acquired from filtering the image in accordance with at least one example embodiment.

FIG. 7 is an image having minimal or no defects and a reference image acquired from filtering the image in accordance with at least one example embodiment. FIG. 8 is an image having no detected defects and a normal image acquired from filtering the image in accordance with at least one example embodiment. FIG. 9 is an image having a detected defect and an abnormal image acquired from filtering the image in accordance with at least one example embodiment.

A difference may be recognized between the normal image illustrated in FIG. 8 and the abnormal image illustrated in FIG. 9. Relations of grey levels between the reference image illustrated in FIG. 7 and the normal and abnormal images may be analyzed respectively. The analysis of the relations may include direct comparison between pixels of two images that are to be compared.

Figure 10:
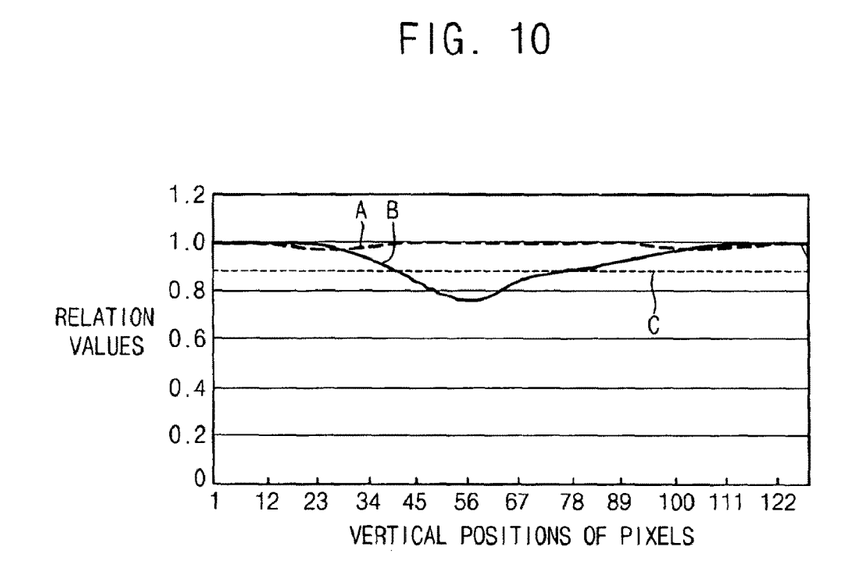
FIG. 10 is a graph illustrating relations of vertical positions of the pixels.

FIG. 10 is a graph illustrating relations of vertical positions of the pixels. Referring to FIG. 10, a horizontal axis may correspond to the vertical positions of the pixels. A vertical axis may correspond to values of the relations. Line A may illustrate relations between the reference image in FIG. 7 and the normal image in FIG. 8. Line B may illustrate relations between the reference image in FIG. 7 and the abnormal image in FIG. 9. Line C may illustrate a predetermined or given relation value.

As illustrated in FIG. 10, line A may have a value of a relation substantially higher than line C. That is, because the value of the relation between the normal image and the reference image is high, the normal image may be similar to the reference image and a defect may not be determined to exist. Line B may include a portion having a value of the relation which may be substantially lower than line C. Because the value of the relation between the abnormal image and the reference image may be low, the abnormal image may be different from the reference image and a defect may be determined to exist.

Figure 11:
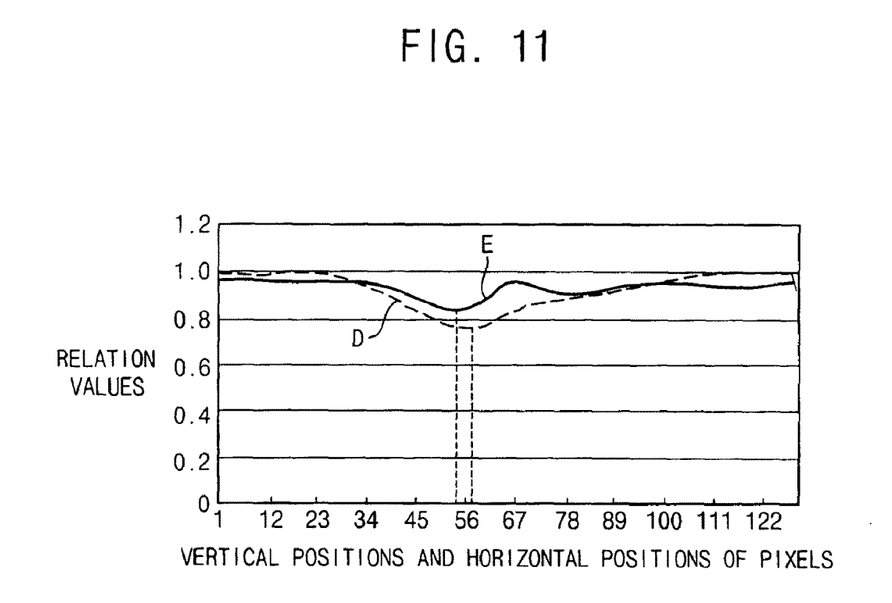
FIG. 11 is a graph illustrating relations of vertical positions and horizontal positions of the pixels.

FIG. 11 is a graph illustrating relations of vertical positions and horizontal positions of the pixels. Referring to FIG. 11, a horizontal axis may correspond to the vertical positions and horizontal positions of the pixels. A vertical axis may correspond to values of the relations. Line D may illustrate relations with respect to the vertical positions of the pixels between the reference image in FIG. 7 and the abnormal image in FIG. 9. Line E may illustrate relations with respect to the horizontal positions of the pixels between the reference image in FIG. 7 and the abnormal image in FIG. 9.

As illustrated in FIG. 11, lines D and E each include a point where the value of the relation reaches a minimum. A vertical position of a pixel where the value of the relation reaches a minimum may be taken in line D. A horizontal position of a pixel where the value of the relation reaches a minimum may be taken in line E. A coordinate value including the vertical position of the pixel and the horizontal position of the pixel may correspond to a position of a defect of the abnormal image.

Therefore, the normal image or the abnormal image may be compared with the reference image so that a defect may be detected.

According to at least one example embodiment, an image of patterns such as cell regions may be Fourier-transformed. A frequency domain, which may be acquired from the Fourier transform, may be low-pass-filtered so that an image whose frequency domain may be removed due to periodical patterns may be acquired. The acquired image and an image of a region to detect defects may be compared so that the defects of the region may be detected. Therefore, a space to store an image may not required. Comparing three images, which may be required in methods for detecting errors according to related art, may not be required. Defects may be detected using only images of a detection region so that a precise align of the images is may not required when comparing the images. Further, a factor that may cause defects due to differences in the colors in the patterns may be removed when filtered.

The foregoing is illustrative of the example embodiments and is not to be construed as limiting thereof.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of detecting defects, the method including:
   acquiring a first image of a detection region on a semiconductor substrate;
   acquiring a second image from the first image by performing a Fourier transform, which transforms a two-dimensional domain to a frequency domain, and performing a low pass filtering, which preserves a low frequency domain among the frequency domain and reduces a high frequency domain among the frequency domain; and
   detecting the defects in the detection region by comparing the second image with a reference image;
   wherein detecting the defects in the detection region includes
      determining whether the defects of the second image exist or not; and
      determining positions of the defects when the defects of the second image exist,
      and
   wherein determining whether the defects of the second image exists or not includes
      calculating relation values between a grey level of pixels in the second image and a grey level of pixels in the reference image with respect to horizontal positions and vertical positions of pixels in the second image and the pixels in the reference image;
      determining that the defect does not exist in the second image when the relation values with respect to the horizontal positions of the pixels and the relation values with respect to the vertical positions of the pixels are larger than a relation value; and
      determining that the defect exists in the second image when at least one among the relation values with respect to the horizontal positions of the pixels and the relation values with respect to the vertical positions of the pixels is smaller than the relation value.

2. The method of claim 1, wherein the detection region includes periodical patterns.

3. The method of claim 1, further including setting the reference image.

4. The method of claim 3, wherein setting the reference image includes:
   acquiring a third image of periodical patterns that has minimal or no defects;
   acquiring a fourth image by performing a Fourier transform and a low pass filtering on the third image; and
   setting the fourth image as the reference image.

5. The method of claim 1, wherein determining the positions of the defects includes:
   acquiring a horizontal position of a pixel where the relation value corresponding to the horizontal position of the pixel is below the relation value and is a minimum relation value, a vertical position of a pixel where the relation value with respect to the vertical position of the pixel is below the relation value of the relation and is a minimum relation value; and
   combining the horizontal position of the pixel and the vertical position of the pixel.

6. The method of claim 1, wherein acquiring a first image of a detection region on a semiconductor substrate includes:
   using one of a charge coupled device (CCD) and a scanning electron microscope (SEM).

7. The method of claim 1, further including displaying the detected defects.

8. An apparatus for detecting defects, the apparatus including:
   a storing unit for storing a reference image;
   a first acquisition unit for acquiring a first image of a detection region on a semiconductor substrate;
   a second acquisition unit for acquiring a second image by filtering the first image; and
   a detecting unit for detecting defects of the detection region by comparing the second image with the reference image;
   wherein the second acquisition unit includes
      a converting part for converting a two-dimensional domain to a frequency domain by Fourier-transforming the first image; and
      a filtering part for low-pass-filtering the first image in order to keep a low frequency domain among the frequency domain and to reduce a high frequency domain,
   wherein the detecting unit includes
      a determining part for determining whether the defect exists in the second image or not; and a setting part for setting a position of the defect when the defect exists in the second image, and wherein the determining part includes a calculating part for calculating relation values between grey level of pixels in the second image and a grey level of pixels in the reference image with respect to horizontal positions and vertical positions of pixels in the second image and the pixels in the reference image; and a determining part for determining that the defect does not exist in the second image when the relation values with respect to the horizontal positions of the pixels and the relation values with respect to the vertical positions of the pixels are larger than a relation value and determining that the defect exists in the second image when at least one among the relation values with respect to the horizontal positions of the pixels and the relation values with respect to the vertical positions of the pixels is smaller than the relation value.

9. The apparatus of claim 8, wherein the detection region includes periodical patterns.

10. The apparatus of claim 8, wherein the first acquisition unit includes:

one of a charge coupled device (CCD) and a scanning electron microscope (SEM).

11. The apparatus of claim 8, further including:

a display unit that displays results from at least one of the first acquisition unit, the second acquisition unit, the storage unit and the detecting unit.

12. The apparatus of claim 11, wherein the display unit further includes:

a map having the shape of a semi conductor substrate for displaying detected defects.

\* \* \* \* \*